United States Patent
Imanishi

(10) Patent No.: US 10,930,958 B2
(45) Date of Patent: Feb. 23, 2021

(54) FUEL CELL SYSTEM

(71) Applicant: TOYOTA JIDOSHA KABUSHIKI KAISHA, Toyota (JP)

(72) Inventor: Masahiro Imanishi, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 27 days.

(21) Appl. No.: 16/542,994

(22) Filed: Aug. 16, 2019

(65) Prior Publication Data

US 2020/0067118 A1 Feb. 27, 2020

(30) Foreign Application Priority Data

Aug. 24, 2018 (JP) .............................. JP2018-157690

(51) Int. Cl.
| | |
|---|---|
| *H01M 4/02* | (2006.01) |
| *H01M 8/04858* | (2016.01) |
| *B60L 58/30* | (2019.01) |
| *H01M 8/0432* | (2016.01) |

(52) U.S. Cl.
CPC ......... *H01M 8/04932* (2013.01); *B60L 58/30* (2019.02); *H01M 8/0432* (2013.01); *B60L 2240/36* (2013.01); *H01M 2250/20* (2013.01)

(58) Field of Classification Search
CPC ...................................................... H01M 4/02
See application file for complete search history.

(56) References Cited

U.S. PATENT DOCUMENTS

| | | | |
|---|---|---|---|
| 2015/0099204 A1* | 4/2015 | O'Neill ............ | H01M 8/04953 429/431 |
| 2017/0294663 A1 | 10/2017 | Nishimori | |
| 2018/0083298 A1 | 3/2018 | Araki et al. | |

FOREIGN PATENT DOCUMENTS

| | | |
|---|---|---|
| EP | 3 324 472 | 5/2018 |
| JP | 2004-178877 | 6/2004 |
| JP | 2010-055974 | 3/2010 |
| JP | 2012-160336 | 8/2012 |
| JP | 2018-045977 | 3/2018 |
| WO | WO 2016/047146 | 3/2016 |
| WO | WO 2017/010069 | 1/2017 |

* cited by examiner

*Primary Examiner* — Jacob B Marks
(74) *Attorney, Agent, or Firm* — Finnegan, Henderson, Farabow, Garrett & Dunner, LLP

(57) ABSTRACT

The fuel cell system includes: a fuel cell unit including first and second fuel cells connected to each other in parallel; a supply system that supplies a reactant gas to the fuel cell unit; a required output power obtainment unit configured to obtain required output power to the fuel cell unit; a supply system control unit configured to control the supply system such that output power of the fuel cell unit is the required output power; a determination unit configured to determine whether or not a predetermined condition is satisfied; and a performance obtainment unit configured to obtain output power performance of the first fuel cell.

12 Claims, 9 Drawing Sheets

FUEL CELL SYSTEM

CROSS-REFERENCE TO RELATED APPLICATION

This application is based upon and claims the benefit of priority of the prior Japanese Patent Application No. 2018-157690, filed on Aug. 24, 2018, the entire contents of which are incorporated herein by reference.

TECHNICAL FIELD

The present disclosure relates to a fuel cell system.

BACKGROUND

There is known a fuel cell system equipped with a fuel cell unit that includes fuel cells connected with each other in parallel (See, for example, Japanese Unexamined Patent Application Publication No. 2012-160336).

In general, the output power performance of the fuel cell deteriorates, as the use time increases. For this reason, the control content of the fuel cell may be changed depending on the output power performance, and it is preferable to obtain the output power performance of the fuel cell as needed. Herein, when the output power of the fuel cell is high, the output power performance of the fuel cell is significantly reflected in the output power thereof. Thus, when the output power of the fuel cell is high, the accurate output power performance of the fuel cell is obtained. However, depending on the required output power to the fuel cell unit, the output power of the fuel cell might be kept low, and a frequency of obtainment of the accurate output power performance of the fuel cell might be reduced.

SUMMARY

It is therefore an object of the present disclosure to provide a fuel cell system that ensures a frequency of obtainment of accurate output power performance of a fuel cell.

The above object is achieved by a fuel cell system including: a fuel cell unit including first and second fuel cells connected to each other in parallel; a supply system that supplies a reactant gas to the fuel cell unit; a required output power obtainment unit configured to obtain required output power to the fuel cell unit; a supply system control unit configured to control the supply system such that output power of the fuel cell unit is the required output power; a determination unit configured to determine whether or not a predetermined condition is satisfied; and a performance obtainment unit configured to obtain output power performance of the first fuel cell, wherein the supply system control unit is configured to, when the predetermined condition is determined to be satisfied, execute a first power generation control to control the supply system such that output power of the first fuel cell increases and that output power of the second fuel cell decreases, as compared with when the predetermined condition is determined to be not satisfied, and the performance obtainment unit is configured to obtain the output power performance of the first fuel cell during execution of the first power generation control.

With such an above configuration, when the predetermined condition is satisfied, the output power of the first fuel cell increases and the output power of the second fuel cell decreases, and then the output power performance of the first fuel cell is obtained. This ensures a frequency of obtainment of the accurate output power performance of the first fuel cell.

The predetermined condition may include a condition that an increasing speed of the required output power is lower than a first threshold.

The predetermined condition may include a condition that an increasing speed of an accelerator opening degree of a vehicle equipped with a motor, for driving the vehicle, operated by the fuel cell unit is lower than a second threshold.

The predetermined condition may include a condition that an accelerator opening degree of a vehicle equipped with a motor, for driving the vehicle, operated by the fuel cell unit is smaller than a third threshold.

The predetermined condition may include a condition that a predetermined section is excluded from a predicted route on which a vehicle equipped with a motor, for driving the vehicle, operated by the fuel cell unit is predicted to drive, and the predetermined section may include an entrance of an expressway, an entrance of a motorway, and at least one of a section where an inclination angle of an upslope is a predetermined value or more and a section where an increasing rate of an inclination angle of an upslope is a predetermined value or more.

The fuel cell system may further include a route obtainment unit configured to obtain the predicted route from a navigation device in which a destination is set.

The fuel cell system may further include a route obtainment unit configured to obtain the predicted route from a storage unit in which a route where the vehicle has already driven is stored.

The predetermined condition may include at least one of a condition that the output power performance of the first fuel cell has not been obtained yet since the fuel cell system starts, a condition that cumulative operation time of the fuel cell system has exceeded a predetermined time, a condition that a driving distance of a vehicle equipped with the fuel cell system has exceeded a predetermined distance, and a condition that time elapsed since the output power performance of the first fuel cell is obtained last time exceeds a predetermined time.

The predetermined condition may include a condition that a temperature of the first fuel cell belongs to a predetermined range.

The performance obtainment unit may be configured to obtain output power performance of the second fuel cell, the supply system control unit may be configured to, when the predetermined condition is determined to be satisfied after the performance obtainment unit obtains the output power performance of the first fuel cell, execute second power generation control for controlling the supply system such that the output power of the second fuel cell increases and that the output power of the first fuel cell decreases, as compared with when the predetermined condition is determined to be not satisfied, and the performance obtainment unit may be configured to obtain the output power performance of the second fuel cell during execution of the second power generation control.

The fuel cell system may further include: a history obtainment unit configured to obtain an operation history of the first fuel cell; and a transmission unit configured to transmit the operation history and the output power performance of the first fuel cell to an external storage device disposed outside the fuel cell system.

The fuel cell system may further include: a history obtainment unit configured to obtain operation histories of the first and second fuel cells; and a transmission unit configured to transmit the operation histories of the first and second fuel cells and the output power performance of the first and second fuel cells to an external storage device disposed outside the fuel cell system.

DETAILED DESCRIPTION

Figure 1:
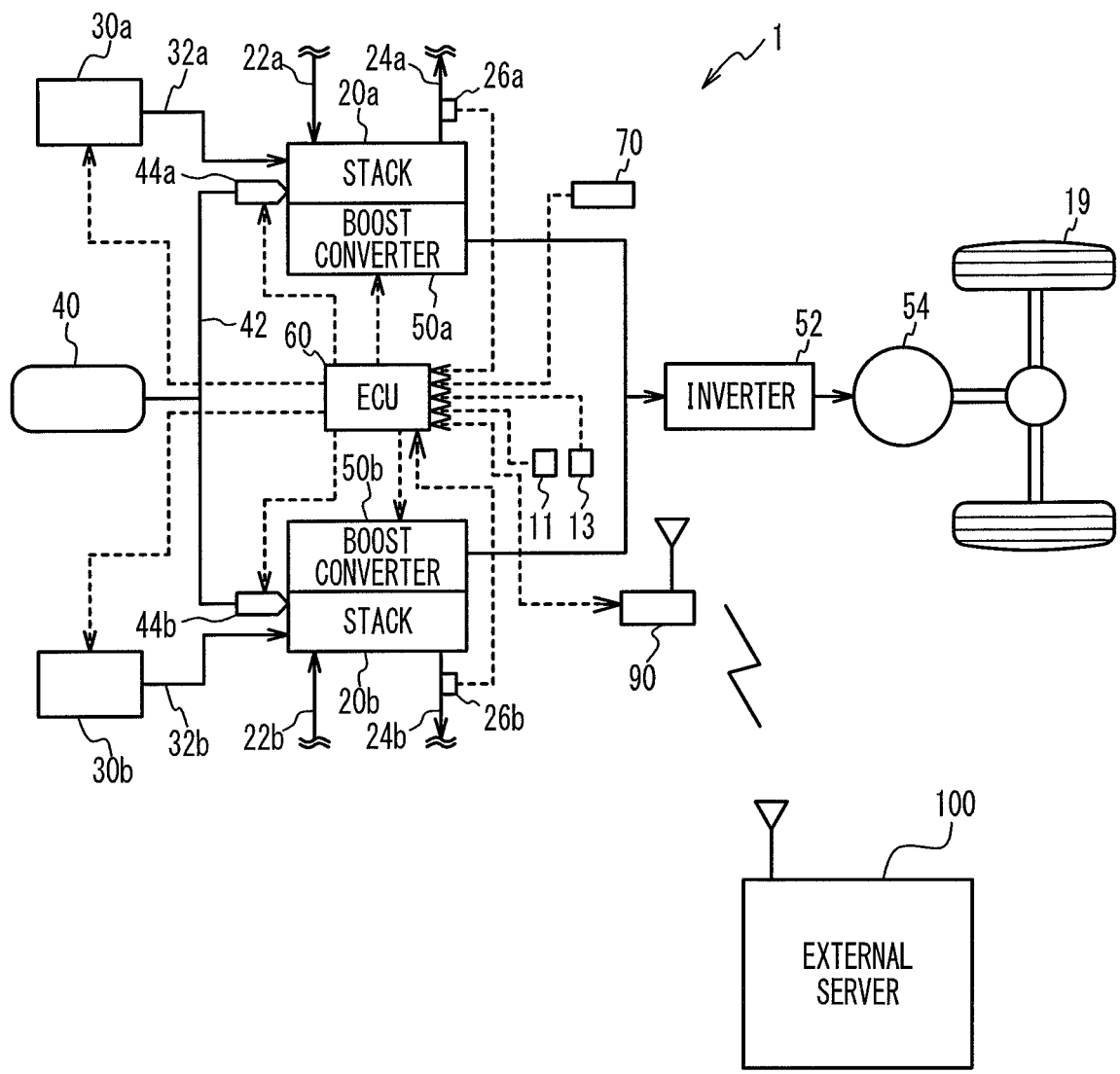
FIG. 1 is a configurational view of a vehicle equipped with a fuel cell system.

FIG. 1 is a configurational view of a vehicle 1 equipped with a fuel cell system and an external server 100. An electronic control unit (ECU) 60 is installed in the fuel cell system mounted on the vehicle 1, and the ECU 60 transmits predetermined data to the external server 100 via a transmission unit 90 by wireless, as will be described later.

[Configuration of Fuel Cell System]

As illustrated in FIG. 1, the fuel cell system mounted on the vehicle 1 includes fuel cell stacks (hereinafter simply referred to as stacks) 20a and 20b, air compressors 30a and 30b, a fuel tank 40, boost converters 50a and 50b, an inverter 52, the ECU 60, a navigation device, the transmission unit 90, and the like. Each of the stacks 20a and 20b receives supply of the oxidant gas and the fuel gas to generate electric power. Each of the stacks 20a and 20b is formed by stacking unit cells of solid polymer electrolyte type. The stacks 20a and 20b are the same stack, and the rated output thereof is also the same. The stacks 20a and 20b are an example of a fuel cell unit, and are also examples of first and second fuel cells connected with each other in parallel.

The air compressors 30a and 30b respectively supply air containing oxygen as the oxidant gas to the stacks 20a and 20b via air pipes 32a and 32b. The fuel tank 40 stores hydrogen gas as the fuel gas, and the fuel gas is supplied to the stacks 20a and 20b via a fuel pipe 42 that is connected to the fuel tank 40 and is branched halfway so as to connect to the stacks 20a and 20b. Specifically, injectors 44a and 44b are respectively provided at a portion of the fuel pipe 42 connected to the stack 20a, and a portion of the fuel pipe 42 connected to the stack 20b. Driving of the injectors 44a and 44b is adjusted, thereby adjusting the flow rate of the fuel gas supplied to the stacks 20a and 20b. The air compressors 30a and 30b and the injectors 44a and 44b are an example of a supply system that supplies a reactant gas to the stacks 20a and 20b. Pipes (not illustrated) that respectively discharge the oxidant off gas and the fuel off gas are connected to each of the stacks 20a and 20b.

A cooling water supply pipe 22a and a cooling water discharge pipe 24a are connected to the stack 20a. The cooling water is supplied through the cooling water supply pipe 22a, and the cooling water is discharged through the cooling water discharge pipe 24a. Likewise, a cooling water supply pipe 22b and a cooling water discharge pipe 24b are connected to the stack 20b. The cooling water is supplied through the cooling water supply pipe 22b, and the cooling water is discharged through the cooling water discharge pipe 24b. The cooling water supply pipes 22a and 22b and the cooling water discharge pipes 24a and 24b constitute a part of a circulation path, not illustrated, through which the cooling water circulates. A radiator that is disposed on the circulation path promotes heat dissipation of the cooling water. Temperature sensors 26a and 26b for detecting the temperature of the cooling water are provided on the cooling water discharge pipe 24a in the vicinity of the stack 20a and on the cooling water discharge pipe 24b in the vicinity of the stack 20b, respectively.

The boost converters 50a and 50b respectively adjust direct-current power output from the stacks 20a and 20b and output the direct-current power to the inverter 52. The inverter 52 converts the direct-current power output from the boost converters 50a and 50b into three-phase alternating current power and supplies the alternating current power to a motor 54. The motor 54 drives the wheels 19 to drive the vehicle 1.

The ECU 60 includes a central processing unit (CPU), a read only memory (ROM), a random access memory (RAM), and the like. The ECU 60 is electrically connected to an ignition switch 11, an accelerator opening degree sensor 13, the temperature sensors 26a and 26b, the injectors 44a and 44b, and the boost converters 50a and 50b. The ECU 60 starts or stops the fuel cell system mounted on the vehicle 1 in accordance with the ON/OFF state of the ignition switch 11. The ECU 60 calculates an accelerator opening degree, which is an opening degree of the accelerator pedal operated by a driver, on the basis of the detection value of the accelerator opening degree sensor 13. The ECU 60 converts the detection values of the temperature sensors 26a and 26b into the temperatures of the stacks 20a and 20b, respectively, and obtains the temperatures of the stacks 20a and 20b. The ECU 60 controls the output power supplied from the boost converters 50a and 50b to the inverter 52 by controlling the boost converters 50a and 50b. A navigation device 70 is electrically connected to the ECU 60. The navigation device 70 incorporates a storage device in which map data is stored, and incorporates a global positioning system (GPS) receiver for obtaining position information of the vehicle 1.

The ECU 60 calculates the required output power to the entire stack 20a and 20b, based on the electric power needed to drive the motor 54 and on the electric power needed to drive auxiliary devices such as the air compressors 30a and 30b. The electric power needed to drive the motor 54 is calculated based on the accelerator opening degree. Further, the ECU 60 controls the rotational speeds of the air compressors 30a and 30b and the opening and closing of the injectors 44a and 44b such that the total output power of the stacks 20a and 20b reaches the required output power. The ECU 60 is configured to be a supply system control unit configured to control the supply system such that the output power of the stacks 20a and 20b reaches the required output power. In the present specification, the term "required output power" means not the required output power to each of the stacks 20a and 20b but the required output power to the entire stacks 20a and 20b, that is, the required output power to the fuel cell unit. Also, in the present specification, "output power" means output power generated by a stack. Further, the ECU 60 executes output power performance obtainment control for obtaining each output power performance of the stacks 20a and 20b, as will be described later in detail. The output power performance obtainment control is executed by a required output power obtainment unit, the supply system control unit, a determination unit, a performance obtainment unit, a history obtainment unit, and a transmission unit that are functionally implemented by the CPU, the ROM, and the RAM of the ECU 60.

[External Server]

The external server 100 is an example of an external storage device disposed outside the fuel cell system. The external server 100 receives and stores data including the output power performance and the operation history of each of the stacks 20a and 20b transmitted by the ECU 60, as will be described later in detail.

[Output Power Performance of Stack]

Figure 2:
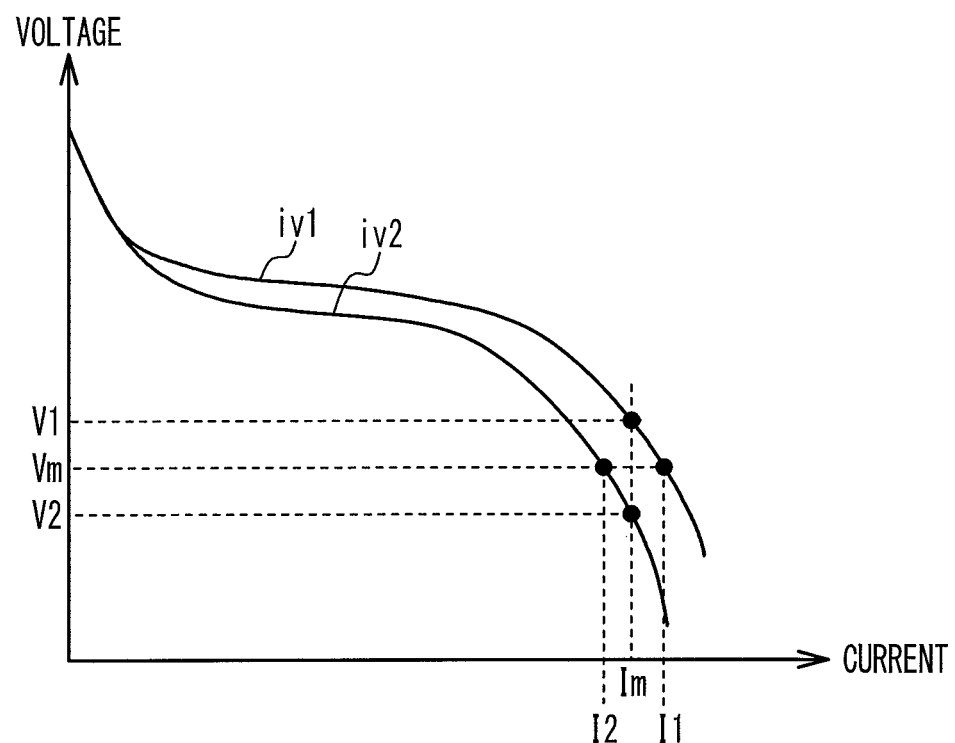
FIG. 2 is a graph illustrating change of IV curve with deterioration of output power performance of a fuel cell.

FIG. 2 is a graph illustrating the change of IV curve with the deterioration of the output power performance of the fuel cell. A vertical axis of FIG. 2 indicates voltage, and a horizontal axis indicates current. FIG. 2 illustrates IV curves iv1 and iv2. The IV curves iv1 and iv2 are obtained by plotting output voltage and output current of the fuel cell. An upper limit current value Im is a preset upper limit value of a range in which the output current of the fuel cell is controllable. A lower limit voltage value Vm is a preset lower limit value of a range in which the output voltage of the fuel cell is controllable.

As illustrated in FIG. 2, in general, the output current increases and the output voltage decreases, as the output power of the fuel cell increases. Also, the IV curve iv1 indicates that the output power performance thereof is higher than the output power performance of the IV curve iv2. Herein, a decreasing amount of the output voltage with respect to an increasing amount of the output current increases, as the output power performance of the fuel cell decreases. For example, as illustrated in FIG. 2, when the output current of the fuel cell is controlled to the upper limit current value Im, a difference between voltage values V1 and V2 respectively indicated by the IV curves iv1 and iv2 is greater than a difference between voltage values corresponding to a current value smaller than the upper limit current value Im. Further, for example, as illustrated in FIG. 2, when the output voltage of the fuel cell is controlled to the lower limit voltage value Vm, a difference between current values I1 and I2 respectively indicated by the IV curves iv1 and iv2 is greater than a difference between current values corresponding to a voltage value higher than the lower limit voltage value Vm. In this way, the output power performance of the fuel cell is significantly reflected in the output power, as the output power increases. Therefore, the output power performance of the fuel cell is accurately obtained, when the output power is large. In a present embodiment, the ECU 60 executes output power performance obtainment control, when a predetermined condition is satisfied. This control increases the output power of one of the stacks 20a and 20b, decreases the output power of the other, and obtains the output power performance of the one of the stacks 20a and 20b. Details will be described below.

[Output Power Performance Obtainment Control]

Figure 3:
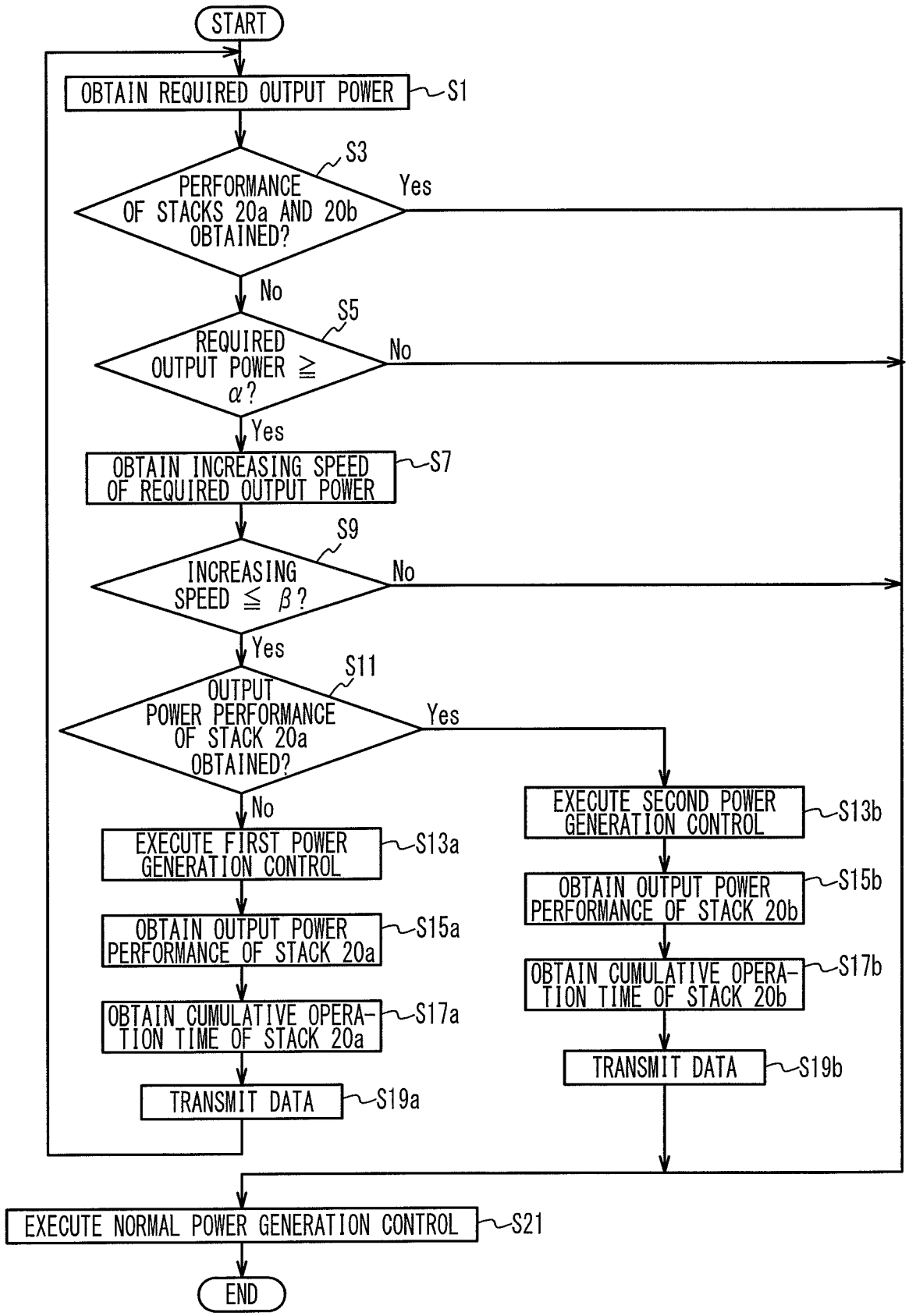
FIG. 3 is a flowchart illustrating an example of output power performance obtainment control.

FIG. 3 is a flowchart illustrating an example of the output power performance obtainment control. The flowchart is repeatedly executed by the ECU 60 in a constant cycle. First, the ECU 60 obtains the required output power (step S1). The ECU 60 obtains the required output power calculated based on the electric power needed to drive the motor 54 and the auxiliary devices as described above. However, since the electric power needed to drive the motor 54 occupies most of the total required output power, for example, the ECU 60 may calculate and obtain the required output power based on the magnitude of the accelerator opening degree. The process of step S1 is an example of a process executed by the required output power obtainment unit that obtains required output power to the stacks 20a and 20b.

Next, it is determined whether or not each output power performance of the stacks 20a and 20b has already been obtained since the fuel cell system starts (step S3). It is determined whether or not the output power performance of the stacks 20a and 20b has already been obtained by referring to an output power performance obtainment flag described later. It is determined whether or not the fuel cell system starts by referring to the state of the ignition switch 11. It is an example of a predetermined condition, for executing first and second power generation control described later, that each output power performance of the stacks 20a and 20b has not been obtained since the fuel cell system starts.

[Normal Power Generation Control]

When each output power performance of the stacks 20a and 20b has already been obtained since the fuel cell system starts (Yes in step S3), the ECU 60 executes the normal power generation control (step S21). This control causes the output power of the stacks 20a and 20b to be the same such that the total output power of the stacks 20a and 20b is the same as the required output power. Specifically, by adjusting driving of the air compressors 30a and 30b and the injectors 44a and 44b, the flow rates of the fuel gas supplied to the stacks 20a and 20b are controlled to be substantially the same, and the flow rates of the oxidant gas supplied to the stacks 20a and 20b are controlled to be substantially the same.

[Required Output Power Determination]

When the output power performance of at least one of the stacks 20a and 20b has not been obtained yet since the fuel cell system starts (No in step S3), the ECU 60 determines whether or not the required output power is equal to or higher than a predetermined value α (Step S5). The predetermined value α is stored in advance in the ROM of the ECU 60. The predetermined value α is equal to or higher than the output power needed to execute processes of steps S13a, S15a, S13b, and S15b described later. In the present embodiment, the predetermined value α is higher than each rated output power of the stacks 20a and 20b. When the required output power is smaller than the predetermined value α (No in step S5), the ECU 60 executes the normal power generation control (step S21).

[Increasing Speed Determination]

When the required output power is equal to or higher than the predetermined value α (Yes in step S5), the ECU 60 obtains the increasing speed of the required output power (step S7), and determines whether or not the increasing speed of the required output power is lower than a first threshold β. (Step S9). The first threshold β is stored beforehand in the ROM of the ECU 60. The ECU 60 obtains the increasing speed of the required output power, for example, as follows. The ECU 60 calculates the required output power based on the accelerator opening degree, the driving states of the auxiliary devices, the driving condition of the vehicle 1, and the like. Next, the ECU 60 calculates the variation amount of the calculated actual required output power per unit time, and obtains the variation amount as the increasing speed of the required output power. It is an example of a predetermined condition, for executing the first and second power generation control described later, that the increasing speed of the required output power is lower than the first threshold β.

When the increasing speed of the required output power is equal to or higher than the first threshold β (No in step S9), the ECU 60 executes the normal power generation control (step S21). That is, when the increasing speed of the required output power is equal to or higher than the first threshold β, the output power of both stacks 20a and 20b increases. Herein, the required output power includes the electric power needed for driving not only the motor 54 but also other auxiliary devices as described above, but the electric power needed for driving the motor 54 occupies most of the required output power. Therefore, a case where the increasing speed of the required output power is equal to or higher than the first threshold β is a case where the increasing speed of the electric power needed for driving the motor 54 is high, that is, for example, a case where sudden acceleration is required to the vehicle 1 in response to driver's acceleration. In such a case, by increasing the output power of both stacks 20a and 20b, it is possible to suppress a response delay of the actual output power of the stacks 20a and 20b with respect to the required output power. This ensures drivability.

When the increasing speed of the required output power is lower than the first threshold β (Yes in step S9), the ECU 60 determines whether or not the output power performance of the stack 20a has already been obtained (step S11). Specifically, the ECU 60 executes this determination, with reference to the output power performance obtainment flag of the stack 20a switched from OFF to ON when the output power performance of the stack 20a is obtained after the fuel cell system starts. The order of steps S5, S7, and S9 is not limited to the case described above.

[First Power Generation Control]

When the output power performance of the stack 20a has not been obtained yet (No in step S11), the ECU 60 executes the first power generation control (step S13a). In the first half of the first power generation control, the output power of the stack 20a increases, and the output power of the stack 20b decreases, as compared with the case where the normal power generation control is executed under the condition that the required power output is the same. In the second half of the first power generation control, the output power of the stack 20a increased in the first half of the first power generation control gradually decreases, and the output power of the stack 20b decreased in the first half of the first power generation control gradually increases, so that each output power of the stacks 20a and 20b is controlled back to each output power thereof in the normal power generation state. Such output power control is executed by adjusting the driving of the air compressors 30a and 30b and the injectors 44a and 44b. Specifically, in the first half of the first power generation control, the flow rates of the fuel gas and the oxidant gas supplied to the stack 20a increase, and the flow rates of the fuel gas and the oxidant gas supplied to the stack 20b decrease. In the second half of the first power generation control, the flow rates of the fuel gas and the oxidant gas supplied to the stack 20a gradually decrease, and the flow rates of the fuel gas and the oxidant gas supplied to the stack 20b gradually increase. In the present embodiment, the output power of the stack 20a increases until the output current of the stack 20a reaches the above-described upper limit current value Im in the first half of the first power generation control, and the output power of the stack 20a decreases back to the original output power thereof in the second half of the first power generation control. Also, the output power of the stack 20b during this time is controlled to increase or decrease such that the total output power of the stacks 20a and 20b is the required output power.

[Obtainment of Output Power Performance of Stack 20a]

Next, the ECU 60 obtains the output power performance of the stack 20a during execution of the first power generation control (step S15a). Specifically, the ECU 60 calculates the output power, by multiplying the upper limit current value Im by the actual output voltage value of the stack 20a at the time when the output current of the stack 20a reaches the upper limit current value Im. The ECU 60 obtains this output power as an index indicating the output power performance of the stack 20a at the present time, and specifically, this output power is stored in the RAM of the ECU 60. The output power, calculated by multiplying the upper limit current value Im by the output voltage value corresponding thereto, corresponds to the maximum output power which the stack 20a is capable of outputting at the present time. In this way, the ECU 60 obtains the output power performance of the stack 20a during execution of the first power generation control in which the output power of the stack 20a is higher than that during execution of the normal power generation control, thereby obtaining the accurate output power of the stack 20a.

When the output power performance of the stack 20a is obtained, the output power performance obtainment flag of the stack 20a described above is switched from OFF to ON. Also, the output power performance of the stack 20a obtained in the output power performance obtainment control executed last time may be updated to the output power performance obtained this time. The output power performance obtained this time may be stored in the RAM of the ECU 60, independently of the output power performance obtained last time. The process of step S15a is an example of a process executed by the output power performance obtainment unit that obtains the output power performance of the stack 20a.

Further, as described above, when the increasing speed of the required output power is lower than the first threshold β, the first power generation control is executed. Herein, unlike the case where the increasing speed of the required output power is equal to or higher than the first threshold β, the case where the increasing speed of the required output power is lower than the first threshold β indicates the driving state that does not need the high response of the actual output power to the required output power. For example, it is a case where the vehicle 1 drives at a constant speed on a flat paved road without slopes. The output power of the stack 20a increases and the output power of the stack 20b decreases in such a case, whereby the frequency of obtainment of the output power performance of the stack 20a is ensured while suppressing the influence on the drivability.

[Obtainment of Cumulative Operation Time of Stack 20a]

Next, the ECU 60 obtains the cumulative operation time of the stack 20a (step S17a). The cumulative operation time of the stack 20a is the total time during which the stack 20a is generating electric power. Here, the CPU of the ECU 60 calculates the cumulative operation time by constantly counting the time during which the output power of the stack 20a is requested during activation of the fuel cell system, and updates and stores the cumulative operation time calculated at predetermined time intervals in the RAM. The CPU of the ECU 60 obtains, from the RAM, the cumulative operation time of the stack 20a when the output power performance of the stack 20a is obtained. Herein, the cumulative operation time of the stack 20a is an example of the operation history that influences the output power performance of the stack 20a. This is because the output power performance of the stack 20a tends to deteriorate as the cumulative operation time of the stack 20a increases. The process of step S17a is an example of a process executed by the history obtainment unit that obtains the operation history of the stack 20a.

[Data Transmission of Stack 20a]

Next, the ECU 60 wirelessly transmits data including the obtained output power performance and the cumulative operation time of the stack 20a to the external server 100 via a network (step S19a). The external server 100 stores data including the output power performance and the cumulative operation time transmitted by the ECU 60. Thus, for example, by accessing the external server 100, it is possible to grasp the relationship between the latest output power performance and the cumulative operation time of the stack 20a. The process of step S19a is an example of a process executed by the transmission unit that wirelessly transmits the operation history of the stack 20a and the output power performance of the stack 20a to the external server 100 disposed outside the fuel cell system. In addition, instead of the external server 100, a cloud server connected to a network may be used as an external storage device.

[Second Power Generation Control]

After transmitting the data including the output power performance and the cumulative operation time of the stack 20a to the external server 100, the ECU 60 executes the processes of step S1 and subsequent steps again. When the ECU 60 has not obtained the output power performance of the stack 20b yet after the fuel cell system starts, No is determined in step S3, and the ECU 60 executes the processes of step S5 and subsequent steps. When Yes is determined in step S11 after steps S5, S7, and S9, the ECU 60 executes the second power generation control (step S13b). Like the first power generation control, the second power generation control is executed. Specifically, in the first half of the second power generation control, the output power of the stack 20b increases and the output power of the stack 20a decreases. In the second half of the second power generation control, the output power of the stack 20b gradually decreases and the output power of the stack 20a gradually increases, and finally, the output power of the stacks 20a and 20b are controlled back to the output power of the normal power generation state. In the second power generation control like the first power generation control, the output power of the stack 20b increases until the output current of the stack 20b reaches the above-described upper limit current value Im in the first half of the second power generation control, and the output power of the stack 20b decreases in the second half of the second power generation control. Also, during this time, the output power of the stack 20a is controlled to increase or decrease such that the total output power of the stacks 20a and 20b satisfies the required output power.

[Obtainment of Output Power Performance of Stack 20b]

Next, the ECU 60 obtains the output power performance of the stack 20b (step S15b). Specifically, like the obtainment of the output power performance of the stack 20a, the RAM of the ECU 60 stores the output power that is calculated by multiplying the upper limit current value Im by the actual output voltage value of the stack 20b at the time when the output current of the stack 20b reaches the upper limit current value Im. The ECU 60 obtains the output power performance of the stack 20b during execution of the second power generation control in the above way, thereby obtaining the accurate output power performance of the stack 20b. When the output power performance of the stack 20b is obtained after the fuel cell system starts, the output power performance obtainment flag of the stack 20b is switched from OFF to ON. The process of step S15b is an example of a process executed by the output power performance obtainment unit that obtains the output power performance of the stack 20b.

[Obtainment of Cumulative Operation Time of Stack 20b]

Next, the ECU 60 obtains the cumulative operation time of the stack 20b (step S17b). Specifically, like the obtainment of the cumulative operation time of the stack 20a, the CPU of the ECU 60 obtains, from the RAM, the cumulative operation time of the stack 20b when the output power performance of the stack 20b is obtained. The process of steps S17a and S17b is an example of a process executed by the history obtainment Unit that obtains the operation history of the stacks 20a and 20b.

[Data Transmission of Stack 20b]

Next, the ECU 60 wirelessly transmits data including the obtained output power performance and the cumulative operation time of the stack 20b to the external server 100 via the network (step S19b). Thus, for example, by accessing the external server 100 from an external terminal, it is possible to grasp the relationship between the output power performance and the cumulative operation time of the stack 20b.

When the output power performance and the cumulative operation time of both stacks 20a and 20b have already been transmitted to the external server 100, by accessing the external server 100, it is possible to grasp the relationship between the output power performance and the cumulative operation time of both stacks 20a and 20b. The process of step S19b is an example of a process executed by the transmitting unit that transmits the cumulative operation time of the stack 20b and the output power performance of the stack 20b to the above-described external server 100. Further, the processes of steps S19a and S19b are an example of a process executed by the transmission unit that transmits the operation history of the stacks 20a and 20b and the output power performance of the stacks 20a and 20b to the above-described external server 100. After step S19b, the normal power generation control (step S21) is executed. In addition, after the ECU 60 obtains the output power performance of both stacks 20a and 20b after the fuel cell system starts, Yes is determined in step S3, and the ECU 60 executes the normal power generation control (step S21).

The ECU 60 changes the control of each of the stacks 20a and 20b in accordance with the output power performance of the stacks 20a and 20b obtained in such a manner. For example, when the output power performance of the stack 20a is lower than the output power performance of the stack 20b, the output power of the stack 20b may be controlled to increase so as to compensate for the decrease in the output power of the stack 20a. Moreover, for example, the output power performance of the stacks 20a and 20b may be displayed on a display in the vehicle in such a manner that the driver grasps it. For example, the output power performance of the stacks 20a and 20b may be indicated as the total maximum output power of the stacks 20a and 20b. Whether the output power performance is in a good or low state may be displayed. Further, when the output power performance of at least one of the stacks 20a and 20b is very low, the driver may be notified by a LIM lamp to be prompted to repair or replace it. Additionally, when there is a large difference in the output power performance between the stacks 20*a* and 20*b*, and when the required output power is equal to or smaller than the maximum output power of one of the stacks 20*a* and 20*b* having the output power performance is higher than that of the other, one of the stacks 20*a* and 20*b* having the high output power performance is preferentially used. This suppresses the frequency of use of the stack having the low output power performance, and suppresses a further deterioration on the output power performance of the stack having the low output power performance.

When the ECU 60 obtains the output power performance of the stacks 20*a* and 20*b*, the output power performance obtainment flag of each of the stacks 20*a* and 20*b* is switched ON, so that No is determined in step S3. When the ignition is switched off, the ECU 60 switches the output power performance obtainment flags of the stacks 20*a* and 20*b* to OFF.

Unlike the present embodiment, in the case where the first or second power generation control is executed when the increasing speed of the required output power is equal to or higher than the first threshold β, the following problems may occur. In order to execute, for example, the first power generation control when the increasing speed of the required output power is equal to or higher than the first threshold β, the output power of the stack 20*a* needs to rapidly increase. However, actually, the output power of the stack 20*a* cannot rapidly increase, so that the response delay the actual output power of the stacks 20*a* and 20*b* with respect to the required output power may occur. This is because, even when the rotational speed of the air compressor 30*a* for supplying the oxidant gas to the stack 20*a* rapidly increases, it is difficult that the flow rate of the oxidant gas actually supplied to the stack 20*a* rapidly increases due to the oxidant gas resistance. Also, this is because, even when the flow rate of the oxidant gas rapidly increases, drying of the electrolyte membrane might proceed and the output power performance might temporarily deteriorate. Therefore, by executing the first or second power generation control when the increasing speed of the required output power is lower than the first threshold β in the present embodiment, the output power performance of the stack 20*a* or 20*b* is obtained without the above response delay.

In the present embodiment, the first and second power generation control may be executed, when the output power performance of both stacks 20*a* and 20*b* has not been obtained yet after the fuel cell system starts (No in step S3), but not limited thereto. For example, the predetermined condition described above may include any one of a condition that the cumulative operation time of the fuel cell system has exceeded a predetermined time, a condition that the driving distance of the vehicle 1 has exceeded a predetermined distance, and a condition that the time elapsed from the time when the output power performance of any one of the stacks 20*a* and 20*b* is previously obtained has exceeded a predetermined time. Herein, when the output power performance of one of the stacks 20*a* and 20*b* is obtained, the output power of one of the stacks 20*a* and 20*b* increases, and in general, the loss also increases and the fuel consumption deteriorates as the output power of the fuel cell increases. For this reason, it is preferable to set the above-described predetermined condition, in consideration of ensuring of the frequency of obtainment of the output power performance and of suppression of deterioration in the fuel consumption.

In the present embodiment, the cumulative operation time of the stacks 20*a* and 20*b* is described as an example of the operation history of the fuel cell, but not limited thereto. For example, the operation history of the stack 20*a* may be at least one of the cumulative number of starting thereof, the cumulative number of stopping thereof, and the cumulative number of starting thereof at outside air temperature below freezing. This is because the output power performance of the stack 20*a* tends to deteriorate, as the cumulative operation time increases, or as the cumulative number of starting or stopping increases. Further, this is because the ice solidified in the unit cells of the stack 20*a* tends to influence the performance of the electrolyte membrane, as the cumulative number of starting at outside air temperature below freezing increases. It is preferable to obtain such a driving history by various sensors and to store it in the RAM of the ECU 60 as needed. For example, the cumulative number of starting and the cumulative number of stopping are calculated by counting the number of times when the ignition switch 11 is turned ON and OFF. The cumulative number of starting at outside air temperature below freezing is calculated by counting cases where the outside air temperature detected by an outside air temperature sensor indicates below freezing when the ignition switch 11 is turned ON.

In the present embodiment, the ECU 60 transmits data including the output power performance and the cumulative operation time of the stack 20*a* and data including the output power performance and the cumulative operation time of the stack 20*b* independently thereof. However, data including the output power performance and the cumulative operation time of both stacks 20*a* and 20*b* may be transmitted at once, after both output power performance and both operation histories are obtained. Further, the ECU 60 may transmit the cumulative operation time of the stacks 20*a* and 20*b* as needed, and may transmit the output power performance of one of the stacks 20*a* and 20*b* when one of the output power performance of the stacks 20*a* and 20*b* is obtained. That is, the transmission timing of data is not limited.

In the above-described steps S13*a*, S13*b*, S15*a*, and S15*b*, the ECU 60 obtains the output power performance in the state where the output current of the stack is controlled to the upper limit current value Im, but not limited thereto. For example, the ECU 60 may calculate the output power by multiplying the lower limit voltage value Vm by the output current value in a state where the output voltage value of the stack is controlled to the lower limit voltage value Vm described above, and the ECU 60 may obtain the output power as the output power performance. In any case, the ECU 60 obtains the output power performance in a state where the output power of the stack is controlled to be the maximum output at present time, but not limited thereto. For example, the ECU 60 may control the output current value of the stack to a predetermined current value so as to expectably achieve 80 percent, preferably, 90 percent of the rated output power of the stack, may calculate the output power by multiplying the predetermined current value by the actual output voltage value corresponding thereto, and may obtain the output power as the output power performance of the stack. Likewise, the ECU 60 may control the output voltage value of the stack to a predetermined voltage value so as to expectably achieve 80 percent, preferably, 90 percent of the rated output power of the stack, may calculate the output power by multiplying the predetermined voltage value by the actual output current value corresponding thereto, and may obtain the output power as the output power performance of the stack. When about 80 percent of the rated output power is achieved, the output power performance of the stack is reflected in the output power thereof. Therefore, the predetermined value α described above may be 80 percent or more of each rated output power of the stacks 20*a* and 20*b*.

Further, in the present embodiment, the ECU 60 obtains the actual output power as the output power performance of the stack, but not limited thereto. For example, the ECU 60 may obtain an output voltage value as an index indicating the output power performance of the stack, in a state in which the output current value of the stack is controlled to the upper limit current value Im. This is because, as illustrated in FIG. 2, the higher the output voltage value corresponding to the upper limit current value Im, the higher the output power performance of the stack. Further, the ECU 60 may obtain an output current value as an index indicating the output power performance of the stack, in a state where the output voltage of the stack is controlled to the lower limit voltage value Vm. This is because, as illustrated in FIG. 2, the higher the output current value corresponding to the lower limit voltage value Vm, the higher the output power performance of the stack.

Figure 4:
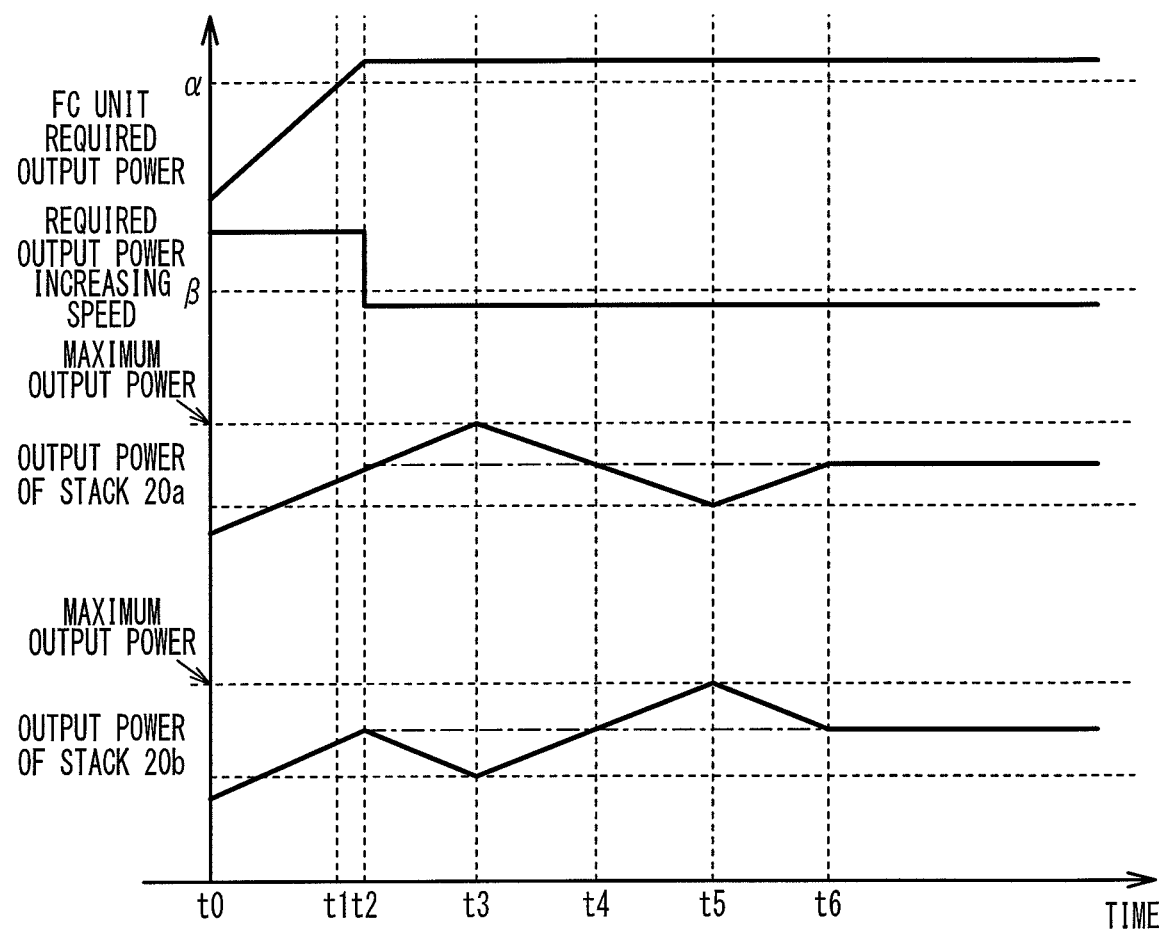
FIG. 4 is a timing chart when output power performance obtainment control is executed.

Next, FIG. 4 is a timing chart when the output power performance obtainment control is executed. FIG. 4 illustrates the transition of the required output power, the transition of the increasing speed of the required output power, and the transition of each output power of the stacks 20a and 20b. The required output power gradually increases from time t0 to time t1, but since the required output power is equal to or smaller than the predetermined value α (No in step S5), the normal power generation control is executed (step S21). Although the required output power is equal to or higher than the predetermined value α (Yes in step S5) from time t1 to time t2, the increasing speed of the required output power is equal to or higher than the first threshold β (No in step S9), and the normal power generation control is continued (step S21). Thus, from time t0 to time t2, the output power of the stack 20a and the output power of the stack 20b increases at substantially the same speed.

After time t2, the required output power is continued to be at the predetermined value α or more (Yes in step S5), and the increasing speed of the required output power is lower than the first threshold β (Yes in step S9). Thus, the first power generation control is executed from time t2 to time t4 (step S13a). In the first half period of the first power generation control from time t2 to time t3, the output power of the stack 20a increases, and the output power of the stack 20b decreases. At time t3, the output power of the stack 20a reaches a maximum, and the ECU 60 obtains the output power performance of the stack 20a (step S15a). In the second half period of the first power generation control from time t3 to time t4, the output power of the stack 20a gradually decreases, and the output power of the stack 20b gradually increases, and then the output power of the stacks 20a and 20b reaches substantially the same at time t4.

At time t4, the required output power is equal to or higher than the predetermined value α (Yes in step S5), the increasing speed of the required output power is lower than the first threshold β (Yes in step S9), and the output power performance of the stack 20a has already been obtained (Yes in step S11). Therefore, the second power generation control is executed (step S13b) from time t4 to time t6. In the first half period of the second power generation control from time t4 to time t5, the output power of the stack 20b increases, and the output power of the stack 20a decreases. At time t5, the output power of the stack 20b reaches a maximum, and the ECU 60 obtains the output power performance of the stack 20b (step S15b). In the second half period of the second power generation control from time t5 to time t6, the output power of the stack 20b gradually decreases and the output power of the stack 20a gradually increases, and then the output power of the stacks 20a and 20b reaches substantially the same at time t6. After time t6, the normal power generation control is executed (step S21).

The output power of the stack 20a gradually decreases from the maximum output power in the second half period of the first power generation control described above. However, the output current value and the output voltage value of the stack 20a may be obtained in the above period, and at least one of the relationship between the output current value and the output voltage value, the relationship between the output current value and the output power value, and the relationship between the output voltage value and the output power value may be obtained as the output power performance of the stack 20a. Therefore, the output power performance of the stack 20a belong to a predetermined range where the output power of the stack 20a is high, and the output power performance of the stack 20a is grasped in more detail. Moreover, in the first half of the first power generation control in which the output power of the stack 20a gradually increases to the maximum output power, the output current value and the output voltage value of the stack 20a may be obtained, and the output power performance of the stack 20a may be obtained. However, in this case, the electrolyte membrane may be dried due to the gradual increase in the flow rate of the oxidant gas during a period in which the output power of the stack 20a gradually increases, and the accurate output power performance may not be obtained. It is thus preferable to obtain the output power performance of the stack 20a in the second half period of the first power generation control in which the output power of the stack 20a gradually decreases from the maximum output power. The above description applies to the stack 20b.

[Output Power Performance Obtainment Control (First Variation)]

Figure 5:
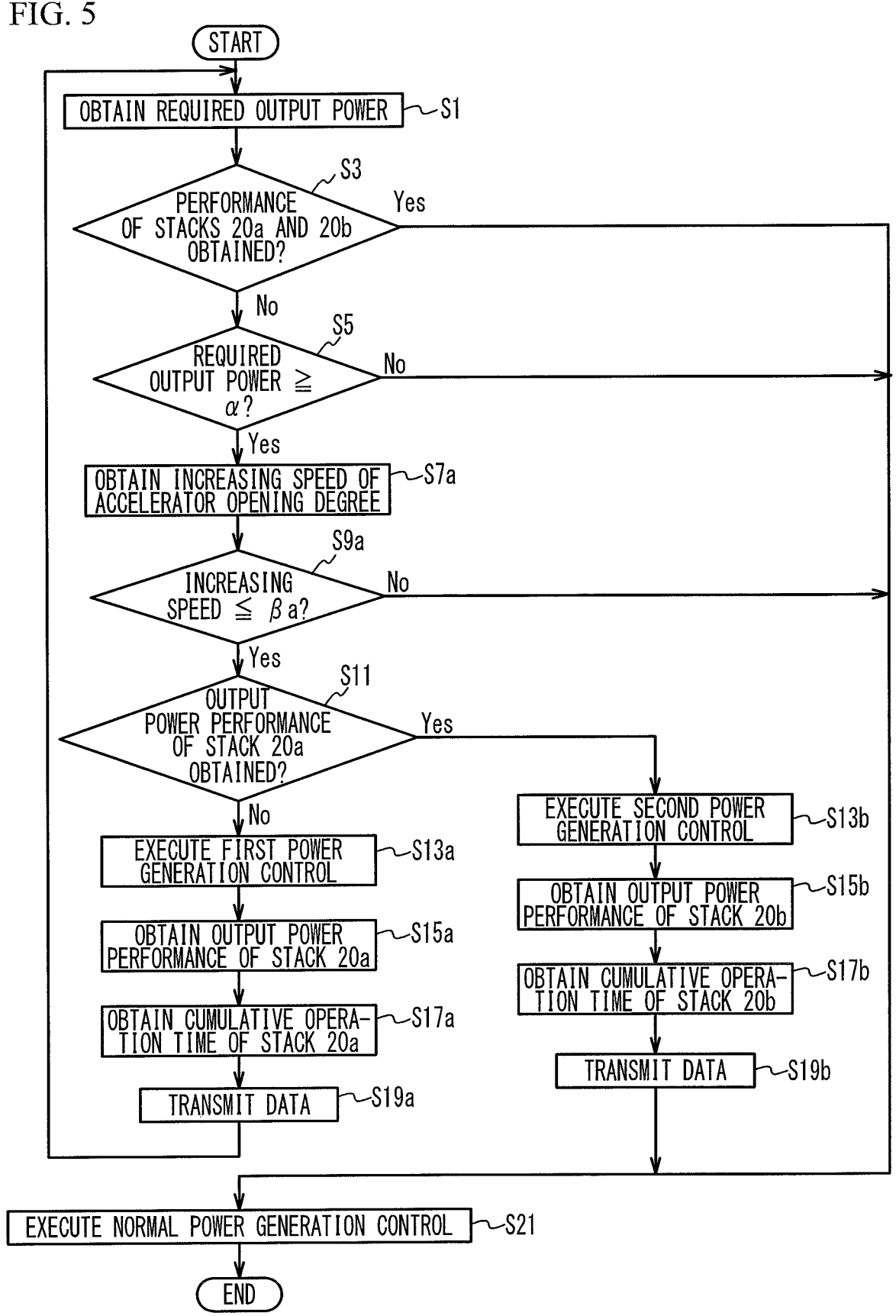
FIG. 5 is a flowchart illustrating an example of the output power performance obtainment control according to a first variation.

Next, a description will be given of the output power performance obtainment control according to variations. The same process as that of the output power performance obtainment control described above is denoted by the same reference numeral, and duplicated description is omitted. FIG. 5 is a flowchart illustrating an example of the output power performance obtainment control according to a first variation. In the first variation, the ECU 60 obtains, not the increasing speed of the required output power itself, but the increasing speed of the accelerator opening degree from the accelerator opening degree sensor 13 (step S7a), and determines whether or not the increasing speed of the accelerator opening degree is lower than a second threshold βa (step S9a). The second threshold βa is preset beforehand in the ROM of the ECU 60. A condition that the increasing speed of the accelerator opening degree is lower than the second threshold βa is an example of a predetermined condition for executing the first and second power generation control.

The ECU 60 obtains the increasing speed of the accelerator opening degree, for example, as follows. The ECU 60 obtains the accelerator opening degree at predetermined time intervals from the accelerator opening degree sensor 13, and divides the difference, between the accelerator opening degree obtained last time and the accelerator opening degree obtained this time, by the predetermined time interval. The obtained value is obtained as the increasing speed of the accelerator opening degree. When the value obtained in this way is a negative, the value indicates that the accelerator opening degree is decreasing. When the value is a positive, the value indicates that the accelerator opening degree is increasing.

Herein, the larger the "accelerator opening degree", the higher the output power to be supplied to the motor 54 from the stacks 20*a* and 20*b*, that is, the higher the required output power. Therefore, the larger the accelerator opening degree, the higher the "increasing speed" of the required output power. Also, as described above, the "required output power" includes the electric power needed to drive not only the motor 54 but also other auxiliary devices, but generally, the electric power needed to drive to the motor 54 is higher than the electric power needed to drive the auxiliary devices. Accordingly, the increasing speed of the accelerator opening degree is correlated with the increasing speed of the required output power. The case where the increasing speed of the accelerator opening degree is high is the case where the vehicle 1 is required to be suddenly started or accelerated. Further, the case where the increasing speed of the accelerator opening degree is low is, for example, the case where the accelerator opening degree is constant and the vehicle 1 is driving at a constant speed. A condition that the increasing speed of the accelerator opening degree is lower than the second threshold βa is an example of a predetermined condition for executing the first and second power generation control.

The increasing speed of the accelerator opening degree is early obtained as compared to the case where the increasing speed of the required output power is obtained in the present embodiment described above. The increasing speed of the required output power is calculated, after the required output power is calculated based on the accelerator opening degree, the driving states of the auxiliary devices, the driving condition of the vehicle 1, and the like. In contrast, the increasing speed of the accelerator opening degree is calculated based only on the change per unit time of the accelerator opening degree. Therefore, before the increasing speed of the required output power actually increases, it is possible to start the process after step S9*a* and the subsequent processes such as the process of step S13*a* early. Therefore, the output power performance is obtained in a short time.

The order of steps S5, S7*a*, and S9*a* is not limited to the above case. Further, when both step S9*a* and step S9 of the present embodiment are executed and Yes is determined in both steps, the process of step S11 and the subsequent processes may be executed. This is because the state where the increasing speed of the required output power does not increase is accurately estimated.

[Output Power Performance Obtainment Control (Second Variation)]

Figure 6:
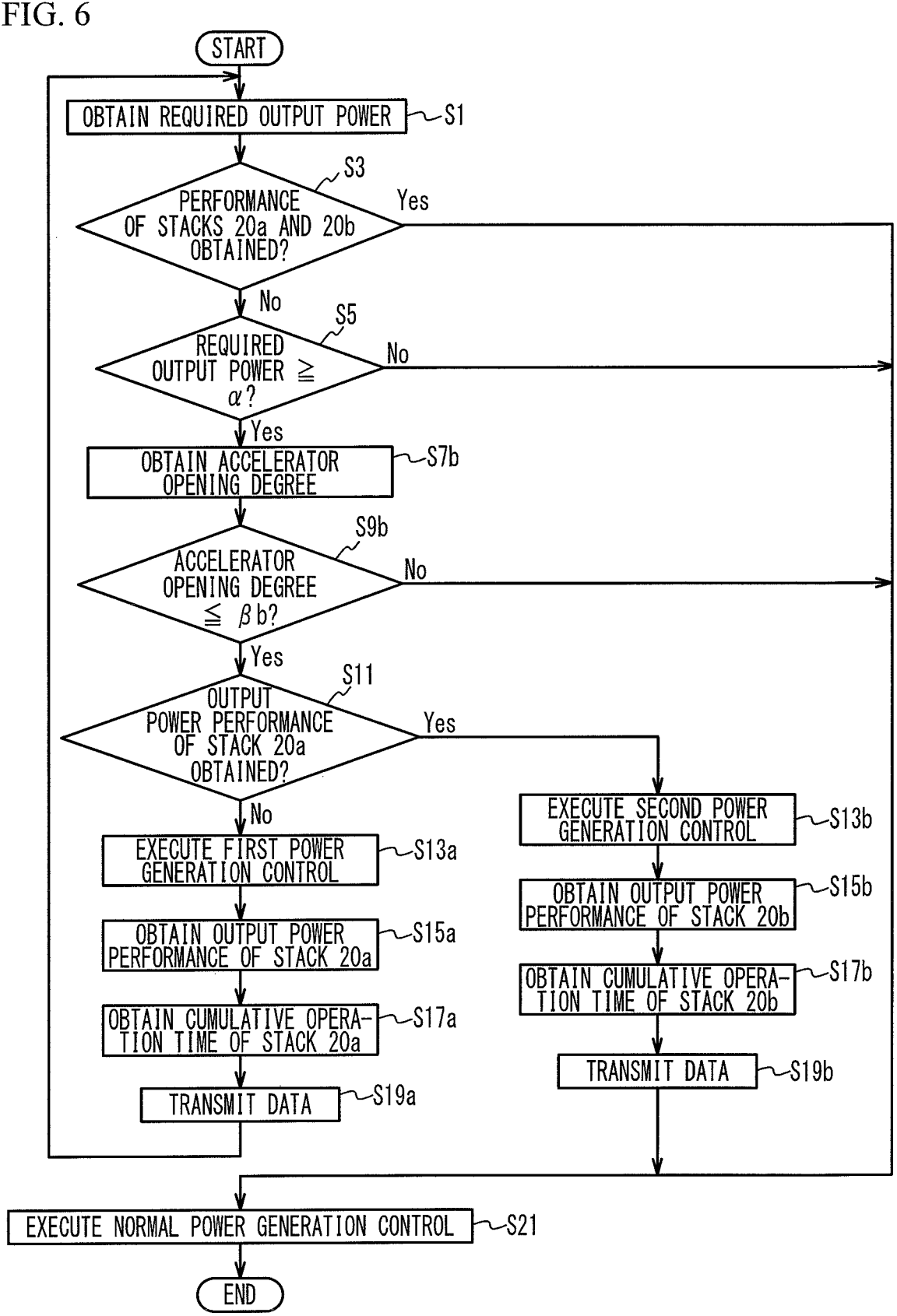
FIG. 6 is a flowchart illustrating an example of the output power performance obtainment control according to a second variation.

FIG. 6 is a flowchart illustrating an example of the output power performance obtainment control according to a second variation. In the second variation, the ECU 60 obtains, not the increasing speed of the accelerator opening degree, but the accelerator opening degree itself (step S7*b*), and determines whether or not the accelerator opening degree is smaller than a third threshold βb (step S9*b*). When the accelerator opening degree is smaller than the third threshold βb, the first or second power generation control may be executed, but when the accelerator opening degree is not smaller than the third threshold βb, the normal power generation control is executed. A condition that the accelerator opening degree is smaller than the third threshold βb is an example of a predetermined condition for executing the first and second power generation control.

When the accelerator opening degree is smaller than the third threshold βb, that is, when the accelerator opening degree is small, the increasing speed of the required output power is estimated to be small. A small accelerator opening degree indicates a small amount of pressing the accelerator pedal, and it is hardly conceivable to operate the accelerator pedal so as to increase the increasing speed of the acceleration opening degree in such a state of the small amount of pressing the accelerator pedal. Further, when the accelerator opening degree is large, the required output power itself is estimated to be high and the increasing speed of the required output power is estimated to be high. A large accelerator opening indicates a large amount of pressing the accelerator pedal, and it is conceivable to have already operated the accelerator pedal from a state of the small amount of pressing the accelerator pedal to a state of the large amount of pressing the accelerator pedal in a short time. By obtaining the accelerator opening degree itself rather than the increasing speed of the accelerator opening in the above manner, the processing load of the ECU 60 is reduced.

The order of steps S5, S7*b*, and S9*b* is not limited to the case described above. Further, when step S9*b* and at least one of steps S9 and 9*a* are executed and Yes is determined in any processes, the process of step S11 and the subsequent processes may be executed.

[Output Power Performance Obtainment Control (Third Variation)]

Figure 7:
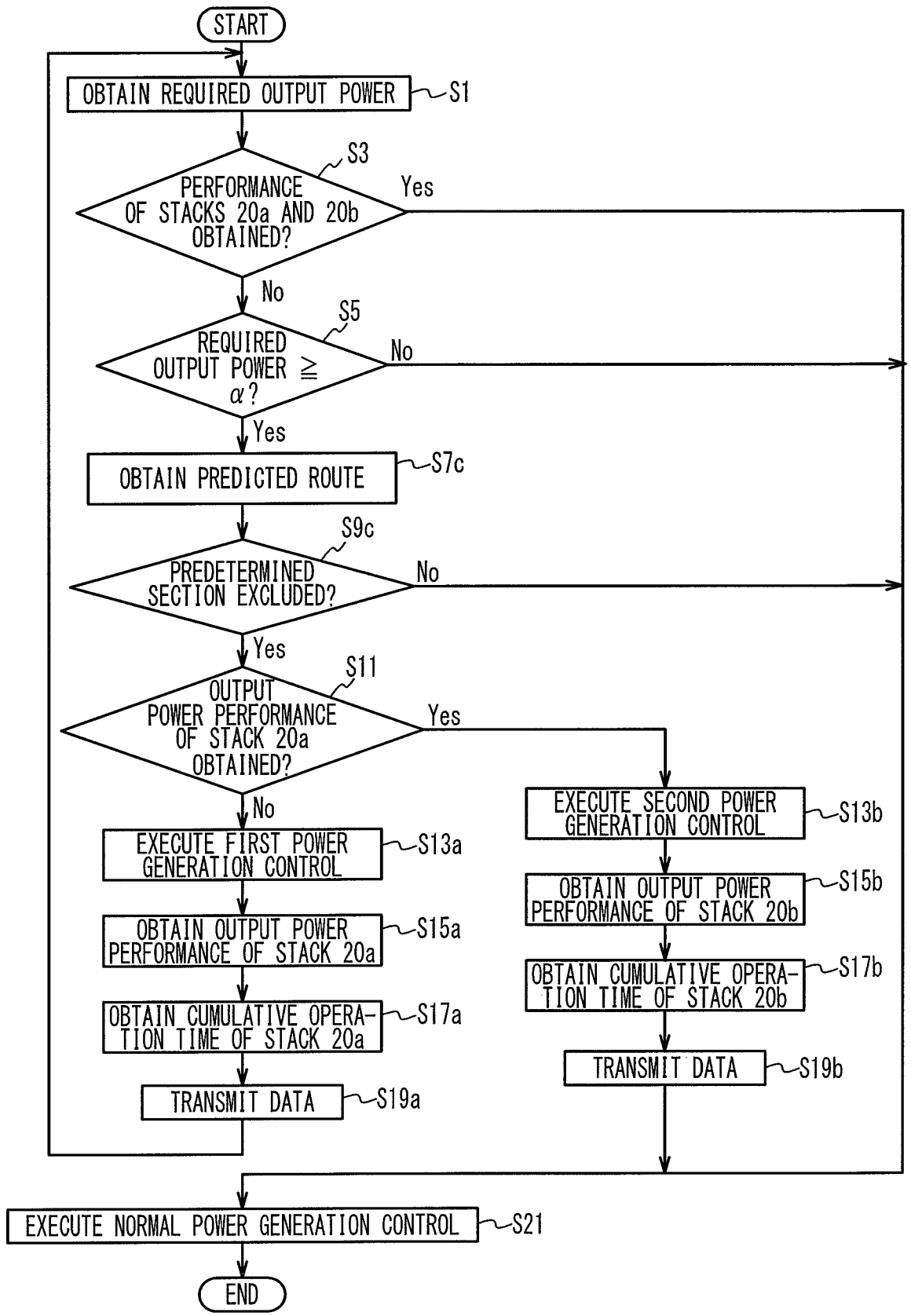
FIG. 7 is a flowchart illustrating an example of the output power performance obtainment control according to a third variation.

FIG. 7 is a flowchart illustrating an example of the output power performance obtainment control according to a third variation. In a third variation, the ECU 60 obtains a predicted route on which the vehicle 1 is predicted to drive within a predetermined period, for example, one minute, from the current position (step S7*c*), and the ECU 60 determines whether or not a predetermined section is excluded from the predicted route (step S9*c*). When a predetermined section is excluded from the predicted route, the first or second power generation control may be executed. However, when the predetermined section is included in the predicted route, the normal power generation control is executed. A condition that the predetermined section is excluded from the predicted route is an example of the predetermined condition for executing the first and second power generation control.

Herein, the above predetermined section includes an entrance of an expressway, an entrance of a motorway, a section where an inclination angle of an upslope is a predetermined value or more, and a section where an increasing rate of an inclination angle of an upslope is a predetermined value or more. When these sections are included in the predicted route, the increasing speed of the required output power is predicted to be high. Herein, the entrance of the expressway is, for example, an Electronic Toll Collection System (ETC) gate or a toll gate. For example, in a case where the entrance of the expressway is included in the predicted route, it is predictable that the vehicle 1 will rapidly accelerate and the increasing speed of the required output power will increase, when the vehicle 1 enters the ETC gate from a general road, or after the vehicle 1 temporally stops at the toll gate and a toll is paid. Likewise, it is predictable, when the vehicle 1 enters the motorway from a general road. Additionally, in a section where the inclination angle of the upslope is a predetermined value or more, it is predictable that the increasing speed of the required output power will increase when the vehicle 1 enters such a section. Even in a section where the increasing rate of the inclination angle of the upslope is a predetermined value or more, it is predictable that the increasing speed of the required output power will increase.

Also, the predetermined section may include an entrance of an expressway and an entrance of a motorway, and any one of a section where an inclination angle of an upslope is a predetermined value or more, and a section where an increasing rate of an inclination angle of an upslope is a predetermined value or more. This is because, in many cases, the section where an inclination angle of an upslope is a predetermined value or more includes the section where an increasing rate of an inclination angle of an upslope is a predetermined value or more, and the section where an increasing rate of an inclination angle of an upslope is a predetermined value or more includes the section where an inclination angle of an upslope is a predetermined value or more. Moreover, it is possible to accurately predict the section where the increasing speed of the required output power will further increase, in the case where the predetermined section includes: a section where an inclination angle of an upslope is a predetermined value or more; and a section where an increasing rate of an inclination angle of an upslope is a predetermined value or more.

The predicted route may be obtained from the navigation device 70 in which a destination is set. This is because, when the destination is set in the navigation device 70, the navigation device 70 calculates the route suitable for the driving of the vehicle 1 on the basis of the set destination, the current position obtained by the GPS receiver, and the stored map data. Further, in the case where a driving history indicating a route on which the vehicle 1 has already driven is stored in the RAM of the ECU 60, the predicted route may be obtained based on such a driving history. Furthermore, the predicted route on which the vehicle 1 is predicted to drive within the predetermined period from the current position may be obtained based on the average vehicle speed of the vehicle 1, the speed limit of the route on which the vehicle 1 is predicted to drive, and the like.

The case where the predicted route where the vehicle 1 is predicted to drive within one minute from the current position is obtained is described above as an example, but not limited thereto. The predicted route may be, for example, within any one of 3 minutes, 5 minutes, 7 minutes, and 10 minutes from the current position. These periods are preferably set, in consideration of the time needed to execute the first and second power generation control and the time needed to obtain each output power performance of the stacks 20a and 20b. That is, in the case where the long time is needed to obtain each output power performance of the stacks 20a and 20b, this period is preferably set long.

The order of steps S5, S7c, and S9c is not limited to the case described above. In addition, when step S9c and at least one of steps S9, S9a, and S9b are executed and YES is determined in any steps, the process after step S11 and the subsequent processes may be executed.

[Output Power Performance Obtainment Control (Fourth Variation)]

Figure 8:
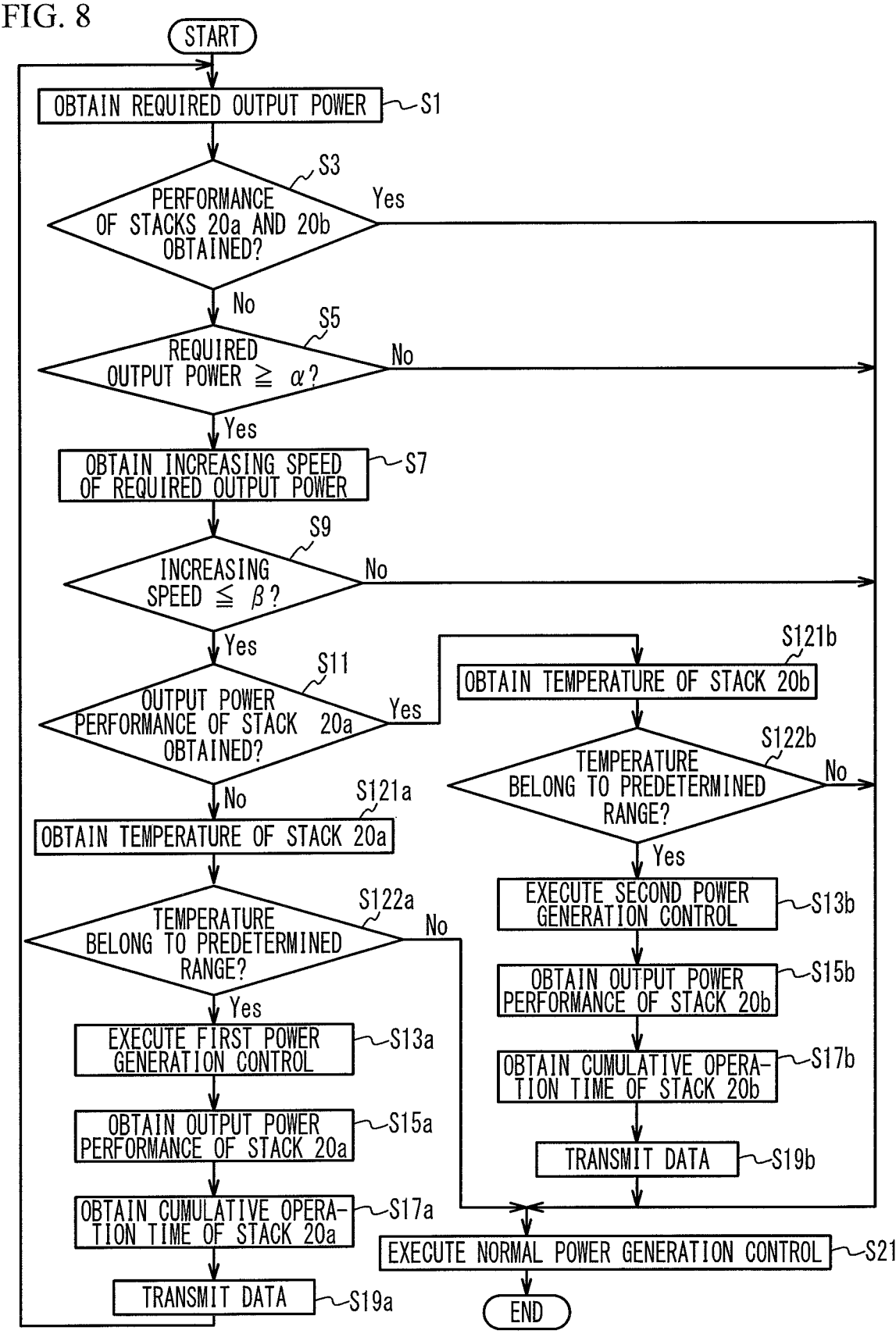
FIG. 8 is a flowchart illustrating an example of the output power performance obtainment control according to a fourth variation.

FIG. 8 is a flowchart illustrating an example of the output power performance obtainment control according to a fourth variation. The output power performance obtainment control according to the fourth variation is achieved by a temperature obtainment unit and a temperature determination unit which are functionally achieved by the ECU 60, unlike the output power performance obtainment control according to the present embodiment described above. When the output power performance of the stack 20a has not been obtained yet (No in step S11), the ECU 60 obtains the temperature of the stack 20a based on the output value from the temperature sensor 26a (step S121a), and determines whether or not the temperature belongs to a predetermined temperature range (step S122a). The predetermined temperature range may be, for example, from 50 degrees Celsius to 80 degrees Celsius, or from 60 degrees Celsius to 70 degrees Celsius.

When the temperature of the stack 20a does not belong to the predetermined temperature range (No in step S122a), the ECU 60 executes the normal power generation control (step S21). However, when Yes is determined in step S122a, the ECU 60 executes the first power generation control (step S13a), and obtains the output power performance of the stack 20a (step S15a). Therefore, the ECU 60 obtains the output power performance of the stack 20a under substantially constant temperature conditions. Therefore, the ECU 60 obtains the output power performance of the stack 20a under the condition that the influence on the output power performance due to the temperature change of the stack 20a is suppressed. Additionally, when the temperature of the stack 20a is too low, the amount of condensed water generated in the stack 20a might increase and the output power performance of the stack 20a might temporarily deteriorate. Further, when the temperature of the stack 20a is too high, the inside of the stack 20a might be dried and the output power performance of the stack 20a may temporarily deteriorate. The ECU 60 obtains the output power performance of the stack 20a, except for the temperature condition that the output power performance may temporarily deteriorate. Accordingly, the ECU 60 obtains the accurate output power performance of the stack 20a. A condition that the temperature of the stack 20a belongs to the predetermined range is an example of a predetermined condition for executing the first power generation control.

Likewise, when the output power performance of the stack 20a has already been obtained (Yes in step S11), the ECU 60 obtains the temperature of the stack 20b based on the output value of the temperature sensor 26b (step S121b), and determines whether or not the temperature belongs to a predetermined temperature range (step S122b). The temperature range of step S122a and the temperature range of step S122b are preferably the same, in order to make the temperature conditions when the ECU 60 obtains the output power performance of the stacks 20a and 20b substantially the same. A condition that the temperature of the stack 20b belongs to a predetermined range is an example of a predetermined condition for executing the second power generation control.

[Configuration of Fuel Cell System (Variation)]

Figure 9:
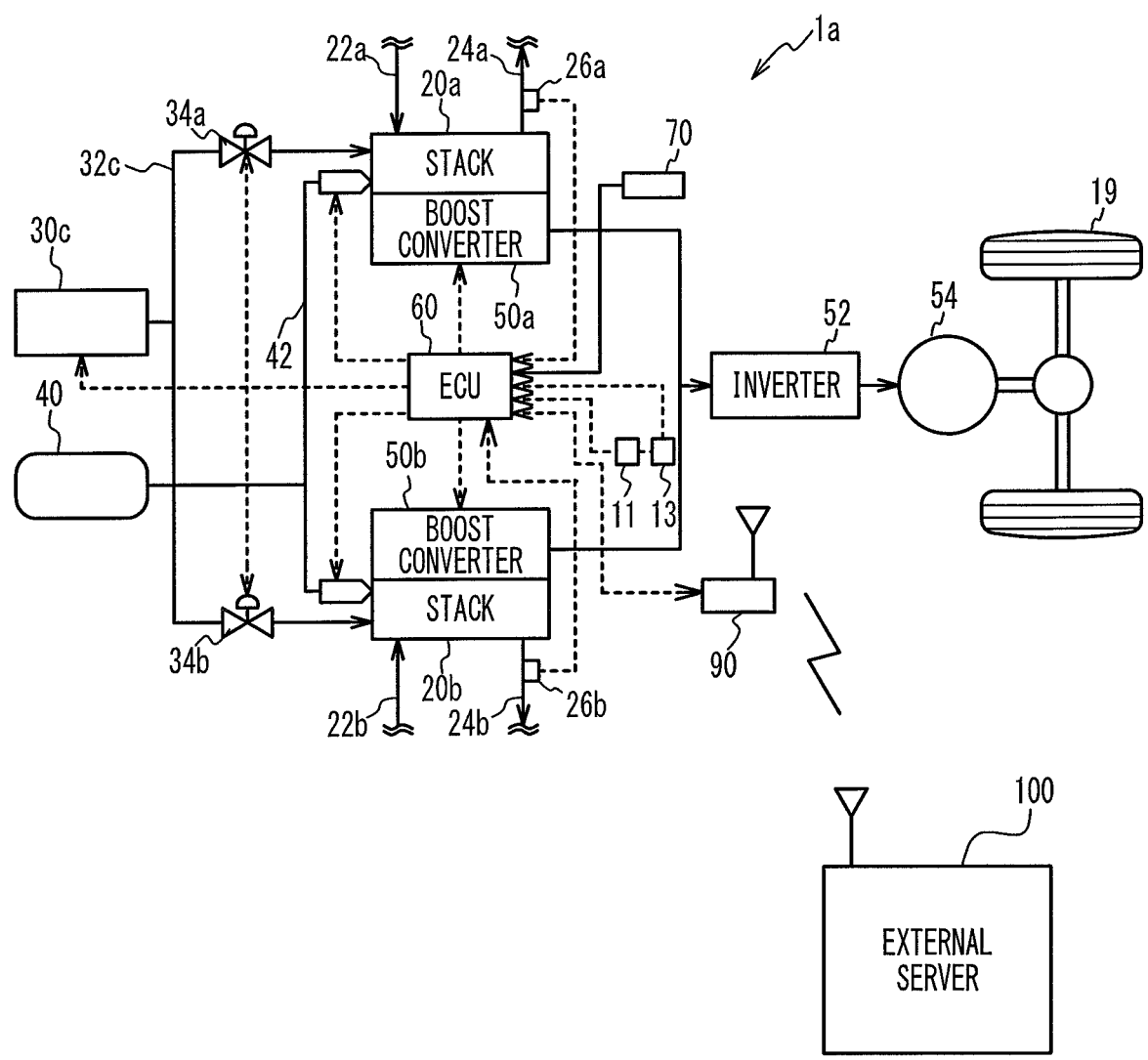
FIG. 9 is a configurational view of a vehicle equipped with a fuel cell system according to a variation.

A fuel cell system according to a variation will be described. FIG. 9 is a configurational view of a vehicle 1a equipped with the fuel cell system according to the variation. In the fuel cell system according to the variation, unlike the present embodiment, a single air compressor 30c is provided instead of the two air compressors 30a and 30b. The air compressor 30c is larger than any of the air compressors 30a and 30b, and is capable of supplying the stack 20a and 20b with the oxidant gas at a flow rate substantially the same as the sum of the maximum flow rates of the oxidant gas by the air compressors 30a and 30b. One end of an air pipe 32c is connected to the air compressor 30c, the air pipe 32c is branched into two on the partway, and the other two ends are respectively connected to the stacks 20a and 20b. The oxidant gas is supplied from the air compressor 30c to the stacks 20a and 20b via the air pipe 32c.

Further, valves 34a and 34b are provided at two branched portions of the air pipe 32c which are branched from each other. Each opening degree of the valves 34a and 34b is adjusted by the ECU 60. By adjusting each opening degree of the valves 34a and 34b, the flow rate of the oxidant gas supplied to each of the stacks 20a and 20b is controlled. The air compressor 30c, the valves 34a and 34b, and the injectors 44a and 44b are an example of a supply system that supplies a reactant gas to the stacks 20a and 20b.

For example, the first power generation control is switched from the normal power generation control, by increasing the opening degree of the valve 34*a* and by decreasing the opening degree of the valve 34*b* from the state where the opening degrees of the valves 34*a* and 34*b* are substantially the same in the normal power generation control. That is, the first power generation control is executed by controlling the opening degrees of the valves 34*a* and 34*b* without changing the rotational speed of the air compressor 30*c*. Likewise, the second power generation control is switched from the normal power generation control by adjusting the opening degrees of the valves 34*a* and 34*b*. Thus, the rotational speed of the air compressor 30*c* is not needed to change in order to execute the first or second power generation control, thereby suppressing an increase in the power consumption due to an increase or a decrease in the rotational speed of the air compressor 30*c*.

[Others]

Although the above-described embodiment and variations include the two stacks 20*a* and 20*b* connected in parallel with each other, they may include three or more stacks connected in parallel with one another. Also in this case, when the increasing speed of the required output power is high, the output power of all the stacks may be controlled to be substantially the same. When the increasing speed of the required output power is low, the output power of at least one stack may be increased and the output power of the other stacks may be decreased, and then the output power performance of the stack with the increased output power may be obtained. This ensures the frequency of obtainment of the output power performance of the stack when the increasing speed of the required output power is low, while suppressing the response delay of the actual output power when the increasing speed of the required output power is high.

The stacks 20*a* and 20*b* in the above-described embodiment and variations have the same rated output, but not limited thereto. When the stacks 20*a* and 20*b* differ from each other in the rated output power, the ratio of the output power of the stack 20*a* to the rated output thereof and the ratio of the output power of the stack 20*b* to the rated output thereof are controlled to be substantially the same in the normal power generation control. In the first power generation control, the ratio of the output power of the stack 20*a* to the rated output thereof may be controlled to be greater than that in the normal power generation state, and the ratio of the output power of the stack 20*b* to the rated output thereof may be controlled to be smaller than that in the normal power generation state.

In the above-mentioned embodiment and variations, the data including the operation histories and the output power performance of the stacks 20*a* and 20*b* are transmitted to the external server 100 by wireless transmission, but not limited to wireless transmission. For example, at the time of repair or the like of the vehicle 1 at a factory, the data including the operation histories and the output power performance of the stacks 20*a* and 20*b* may be transmitted to an information processing terminal such as a computer disposed outside of the vehicle 1 via a cable connected to the ECU 60.

In the above-described embodiment and variations, the fuel cell system is mounted on a vehicle, but not limited thereto. For example, a stationary fuel cell system may be used. A vehicle may be not only a car but also a two-wheeled vehicle, a railway vehicle, a ship, an aircraft, or the like. Additionally, the vehicle 1 may be a hybrid vehicle that uses the motor 54 and an internal combustion engine together for driving.

Although some embodiments of the present disclosure have been described in detail, the present disclosure is not limited to the specific embodiments but may be varied or changed within the scope of the present disclosure as claimed.

The invention claimed is:

1. A fuel cell system comprising:
  a fuel cell unit including first and second fuel cells connected to each other in parallel;
  a supply system that supplies a reactant gas to the fuel cell unit;
  a required output power obtainment unit configured to obtain required output power to the fuel cell unit;
  a supply system control unit configured to control the supply system such that output power of the fuel cell unit is the required output power;
  a determination unit configured to determine whether or not a predetermined condition is satisfied; and
  a performance obtainment unit configured to obtain output power performance of the first fuel cell,
  wherein
  the supply system control unit is configured to, when the predetermined condition is determined to be satisfied, execute a first power generation control to control the supply system such that output power of the first fuel cell increases and that output power of the second fuel cell decreases, as compared with when the predetermined condition is determined to be not satisfied, and
  the performance obtainment unit is configured to obtain the output power performance of the first fuel cell during execution of the first power generation control.

2. The fuel cell system of claim 1, wherein the predetermined condition includes a condition that an increasing speed of the required output power is lower than a first threshold.

3. The fuel cell system of claim 1, wherein the predetermined condition includes a condition that an increasing speed of an accelerator opening degree of a vehicle equipped with a motor, for driving the vehicle, operated by the fuel cell unit is lower than a second threshold.

4. The fuel cell system of claim 1, wherein the predetermined condition includes a condition that an accelerator opening degree of a vehicle equipped with a motor, for driving the vehicle, operated by the fuel cell unit is smaller than a third threshold.

5. The fuel cell system of claim 1, wherein the predetermined condition includes a condition that a predetermined section is excluded from a predicted route on which a vehicle equipped with a motor, for driving the vehicle, operated by the fuel cell unit is predicted to drive, and
  the predetermined section includes an entrance of an expressway, an entrance of a motorway, and at least one of a section where an inclination angle of an upslope is a predetermined value or more and a section where an increasing rate of an inclination angle of an upslope is a predetermined value or more.

6. The fuel cell system of claim 5, further comprising a route obtainment unit configured to obtain the predicted route from a navigation device in which a destination is set.

7. The fuel cell system of claim 5, further comprising a route obtainment unit configured to obtain the predicted route from a storage unit in which a route where the vehicle has already driven is stored.

8. The fuel cell system of claim 1, wherein the predetermined condition includes at least one of a condition that the output power performance of the first fuel cell has not been obtained yet since the fuel cell system starts, a condition that cumulative operation time of the fuel cell system has exceeded a predetermined time, a condition that a driving distance of a vehicle equipped with the fuel cell system has exceeded a predetermined distance, and a condition that time elapsed since the output power performance of the first fuel cell is obtained last time exceeds a predetermined time.

9. The fuel cell system of claim 1, wherein the predetermined condition includes a condition that a temperature of the first fuel cell belongs to a predetermined range.

10. The fuel cell system of claim 1, wherein
the performance obtainment unit is configured to obtain output power performance of the second fuel cell,
the supply system control unit is configured to, when the predetermined condition is determined to be satisfied after the performance obtainment unit obtains the output power performance of the first fuel cell, execute second power generation control for controlling the supply system such that the output power of the second fuel cell increases and that the output power of the first fuel cell decreases, as compared with when the predetermined condition is determined to be not satisfied, and
the performance obtainment unit is configured to obtain the output power performance of the second fuel cell during execution of the second power generation control.

11. The fuel cell system of claim 1, further comprising:
a history obtainment unit configured to obtain an operation history of the first fuel cell; and
a transmission unit configured to transmit the operation history and the output power performance of the first fuel cell to an external storage device disposed outside the fuel cell system.

12. The fuel cell system of claim 10, further comprising:
a history obtainment unit configured to obtain operation histories of the first and second fuel cells; and
a transmission unit configured to transmit the operation histories of the first and second fuel cells and the output power performance of the first and second fuel cells to an external storage device disposed outside the fuel cell system.

* * * * *